(12) United States Patent
Chang

(10) Patent No.: US 7,920,364 B2
(45) Date of Patent: Apr. 5, 2011

(54) POWER SUPPLY WITH ADJUSTABLE OUTPUTTED VOLTAGE

(76) Inventor: Li-Chih Chang, Taipei (TW)

( * ) Notice: Subject to any disclaimer, the term of this patent is extended or adjusted under 35 U.S.C. 154(b) by 584 days.

(21) Appl. No.: 12/112,404

(22) Filed: Apr. 30, 2008

(65) Prior Publication Data

US 2009/0273865 A1    Nov. 5, 2009

(51) Int. Cl.
*H02H 7/00* (2006.01)
*H02H 9/00* (2006.01)

(52) U.S. Cl. .......................................... 361/18
(58) Field of Classification Search ...................... 361/18
See application file for complete search history.

(56) References Cited

U.S. PATENT DOCUMENTS

| | | | |
|---|---|---|---|
| 5,808,376 A * | 9/1998 | Gordon et al. | 307/66 |
| 5,901,056 A | 5/1999 | Hung | |
| 5,995,393 A * | 11/1999 | Deierlein | 363/49 |
| 6,144,187 A * | 11/2000 | Bryson | 320/137 |
| 6,169,669 B1 * | 1/2001 | Choudhury | 363/37 |
| 6,452,816 B2 * | 9/2002 | Kuranuki et al. | 363/17 |
| 6,650,560 B2 | 11/2003 | MacDonald et al. | |
| 6,717,386 B1 * | 4/2004 | Kanasugi et al. | 322/27 |
| 7,459,894 B2 * | 12/2008 | Li et al. | 323/285 |
| 7,558,037 B1 * | 7/2009 | Gong et al. | 361/93.1 |
| 7,750,872 B2 * | 7/2010 | Iguchi et al. | 345/75.2 |
| 2003/0205991 A1 * | 11/2003 | McDonald et al. | 323/271 |
| 2005/0248323 A1 * | 11/2005 | Lathrop et al. | 323/222 |
| 2008/0130336 A1 * | 6/2008 | Taguchi | 363/125 |

* cited by examiner

*Primary Examiner* — Ronald W Leja
(74) *Attorney, Agent, or Firm* — Chun-Ming Shih; HDLS IPR Services

(57) ABSTRACT

A power supply with adjustable outputted voltage includes an AC power input processing circuit and a DC power input processing circuit. The AC power input processing circuit has at least one voltage adjuster that is electrically connected with the DC power input processing circuit for adjusting the outputted voltage. The DC power input processing circuit includes a current sensor, a DC/DC converter, a ripple filter, and a DC/DC self-drive switch. When an extremely large inputted current is detected by the current sensor and the DC/DC converter stops actions, the DC/DC self-drive switch is turned off to protect the circuit.

14 Claims, 2 Drawing Sheets

POWER SUPPLY WITH ADJUSTABLE OUTPUTTED VOLTAGE

BACKGROUND OF THE INVENTION

1. Field of the Invention

The present invention relates to a power supply, and in particular to a dual-input power supply with adjustable outputted voltage.

2. Description of Prior Art

A power supply with dual-input power sources has an AC power input and a DC power input, and it converts these two inputted power sources into a DC voltage output for subsequent use. As a result, this kind of power supply can be used indoors or outdoors.

U.S. Pat. Nos. 5,901,056 and 6,650,560 disclose a conventional power supply with dual-input power sources respectively. When the power supply disclosed in each of the-above mentioned patents is in use, an AC power plug is inserted into an indoor AC wall power socket, so that the AC power input can be converted into a DC power input via an AC power processing circuit provided in the power supply. When the power supply with dual-input power sources is taken to the outdoors, a DC plug (such as a plug of a cigarette lighter) can be inserted into a DC power socket of a car. After the DC power is inputted into the power supply and is converted by the DC power processing circuit, the converted power can be supplied for the subsequent use.

The conventional power supply with dual-input power sources has a main transformer in the AC power input processing circuit. Further, it also has a fuse in order to protect against an extremely large current and isolate the circuit. However, the conventional power supply with dual-input and outputted power sources has no protection design in the DC power input processing circuit. As a result, if an extremely large current is inputted to the DC power input end, the loaded electronic device at the user's end may suffer damage.

SUMMARY OF THE INVENTION

In view of the above drawbacks, the power supply of the present invention is additionally provided with a DC/DC self-drive switch in the DC power input processing circuit. When the DC/DC converter in the DC power input processing circuit is inactive, the DC/DC self-drive switch turns off, thereby isolating an AC power input processing circuit and the DC power input processing circuit. At the same time, when an extremely large current enters the DC power input processing unit, the DC/DC self-drive switch will be turned off to protect the circuit.

The present invention provides a power supply with adjustable outputted voltage, which includes an AC power input processing circuit and a DC power input processing circuit. The AC power input processing circuit is used to convert an AC power into a DC power output. The DC power input processing circuit is electrically connected with the AC power input processing circuit, thereby converting the DC power into a DC power output. The AC power input processing circuit has a voltage adjuster that is electrically connected with the DC power input processing circuit for adjusting the outputted voltage. The DC power input processing circuit comprises a current sensor, a DC/DC converter, a ripple filter, and a DC/DC self-drive switch. The DC/DC converter is electrically connected with the current sensor and the voltage adjuster. The ripple filter is electrically connected with the DC/DC converter. The DC/DC self-drive switch is electrically connected with the voltage adjuster, the current sensor and the DC/DC converter. When an extremely large inputted current is detected by the current sensor (or in other scenario, the DC/DC converter stops action), the DC/DC self-drive switch is automatically turned off to shut down output current for protection.

DETAILED DESCRIPTION OF THE INVENTION

The technical contents and detailed description of the present invention will be described with reference to the accompanying drawings.

Figure 1:
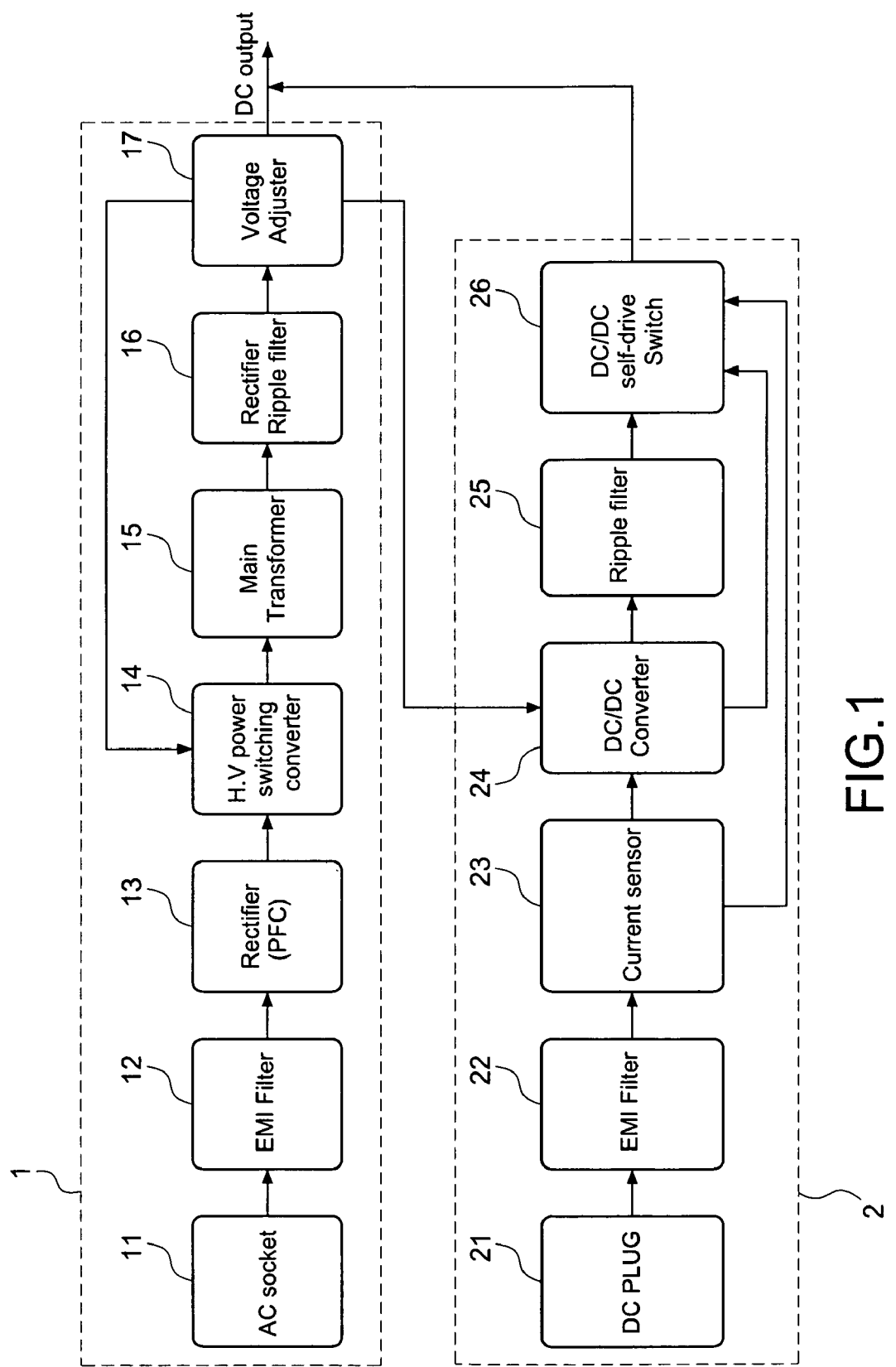
FIG. 1 is a block view showing the circuit of the power supply with adjustable outputted voltage of the present invention.
Figure 2:
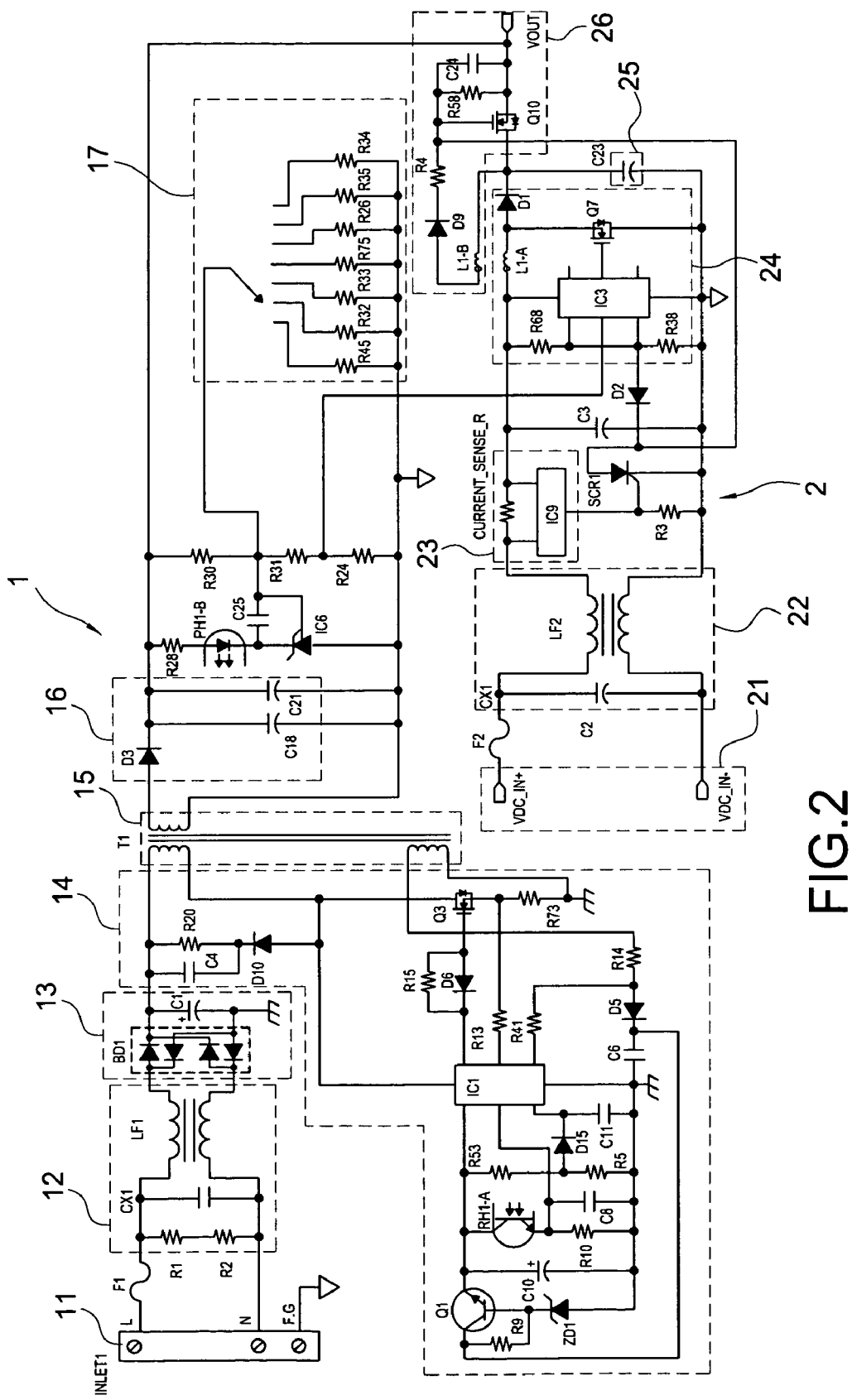
FIG. 2 is a schematic view showing the primary circuitry of the power supply with adjustable outputted voltage of the present invention.

FIG. 1 is a block view showing the circuit of the power supply with adjustable outputted voltage of the present invention, and FIG. 2 is a schematic view showing the primary circuitry of the power supply with adjustable outputted voltage of the present invention. As shown in these figures, the power supply with adjustable outputted voltage of the present invention comprises an AC power input processing circuit 1 and a DC power input processing circuit 2.

The AC power input processing circuit 1 includes an AC socket 11, an Electromagnetic Interference (EMI) filter 12, a rectifier 13, a high-voltage power switching converter 14, a main transformer 15, a rectifier & ripple filter 16, and a voltage adjuster 17.

The AC socket 11 receives an AC power from an AC power cable inserted thereto where the AC power cable is plugged to a wall power socket.

The EMI filter 12 is electrically connected with the AC socket 11 for filtering off the noises generated by the high-voltage power switching converter 14.

The rectifier 13 is electrically connected with the EMI filter 12 for converting the AC power outputted by the EMI filter 12 into a DC power. The rectifier 13 can be further provided with a power factor correction circuit for reducing the amount of inputted current.

The high-voltage power switching converter 14 is electrically connected with the rectifier 13 and the voltage adjuster 17. The high voltage power switching converter 14 is controlled by the voltage adjuster 17 to adjust the outputted voltage. In the drawings, the high-voltage power switching converter 14 can be designed as a flyback converter, a forward converter, a halfbridge converter, an active clamp flyback converter, an active clamp forward converter or the like.

The main transformer 15 is electrically connected with the high-voltage switching converter 14 for providing isolation and transferring energy.

The rectifier & ripple filter 16 is electrically connected with the main transformer 15 for converting a high-frequency AC current into a DC current, thereby outputting a DC voltage.

The voltage adjuster 17 is electrically connected with the rectifier & ripple filter 15, the high-voltage switching converter 14 and the DC/DC converter 24 for adjusting the outputting voltage.

The DC power input processing circuit 2 comprises a DC plug 21, an EMI filter 22, a current sensor 23, a DC/DC converter 24, a filter 25 and a DC/DC self-drive switch 26.

The DC plug 21 is a plug of a cigarette lighter for inserting into a DC power socket.

The EMI filter 22 is electrically connected with the DC plug 21 for filtering off the noises generated by the DC/DC converter 24.

The current sensor 23 is electrically connected with the EMI filter 22 and the DC/DC self-drive switch 26. When an extremely large inputted current is detected, the DC/DC self-drive switch 26 turns off to protect the circuit.

The DC/DC converter 24 is electrically connected with the current sensor 23, the DC/DC self-drive switch 26, the voltage adjustor 17 and the filter 25. The DC/DC converter 24 is controlled by the signals outputted by the voltage adjuster 17, thereby adjusting the outputted voltage. When the DC/DC converter 24 stops actions, the DC/DC self-drive switch 26 is also turned off, thereby blocking the output from the DC power input processing circuit 2. In the drawings, the DC/DC converter 24 can be designed as a buck converter, a boost converter, a buck-boost converter, a Single Ended Primary Inductor Converter (SEPIC) converter or the like.

The ripple filter 25 is electrically connected with the DC/DC converter 24 and the DC/DC self-drive switch 26. The ripple filter 25 is used to filter off the noises contained in the outputted voltage of the DC/DC converter 24.

The DC/DC self-drive switch 26 is electrically connected with the current sensor 23, the DC/DC converter 24 and the ripple filter 25. When an extremely larger inputted current is detected by the current sensor 23 or the DC/DC converter 24 stops actions, the DC/DC self-drive switch 26 is turned off to protect the circuit.

When the user uses the power supply in a house, he or she inserts the AC power cable (which is already connected to a wall power socket) into the AC socket 11, so that an AC power can be converted into a DC power output via the EMI filter 12, the rectifier 13, the high-voltage power switching converter 14, the main transformer 15, the rectifier & ripple filter 16, and the voltage adjuster 17, thereby providing the necessary DC power for loaded device. When the power supply is electrically connected to different loaded devices and thus it is necessary to change the outputted voltage, the user can adjust the voltage adjuster 17 to allow the high-voltage switching converter 14 to change the outputted voltage. After being processed by the main transformer 15 and the rectifier & ripple filter 16, the outputted voltage is suitable for the different loaded devices. In this situation, input DC power is not present and the DC/DC self-drive switch 26 is turned off correspondingly. Therefore, the DC power input processing circuit 2 has no effect on the outputted voltage.

When the user uses the power supply of the present invention in a car, he or she inserts the DC plug 21 into an automobile DC power socket to receive an input DC power. After the input DC power is processed by the EMI filter 22, the current sensor 23, the DC/DC converter 24, the ripple filter 25 and the DC/DC self-drive switch 26, an output DC power is generated at the same output node of the AC power input processing circuit 1 for subsequent use. When the power supply is electrically connected to different loaded devices and it is necessary to change the outputted voltage, the user can adjust the voltage adjuster 17 to allow the DC/DC converter 24 to change the outputted voltage in the output DC power. After the outputted voltage is processed by the DC/DC converter 24, the ripple filter 25 and the DC/DC self-drive switch 26, it is suitable for different loaded devices.

When an extremely large inputted current is detected by the current sensor 23, the DC/DC self-drive switch 26 is automatically turned off to cut out a conduction path between the input DC power and the output DC power, namely to shut down the output current, for protection. Moreover, the DC/DC self-drive switch 26 is also automatically turned off when the DC/DC converter 24 stops actions. In the present invention, the DC/DC self-drive switch 26 can be implemented by relay, JFET, or MOSFET.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power supply with adjustable outputted voltage, comprising:
    an AC power input processing circuit for converting an AC power into a DC power output;
    a DC power input processing circuit electrically connected with the AC power input processing circuit for converting a DC power into a DC power output;
    wherein the AC power input processing circuit has a voltage adjuster that is electrically connected with the DC power input processing circuit for adjusting the outputted voltage;
    the DC power input processing circuit comprises:
        a current sensor;
        a DC/DC converter electrically connected with the current sensor and the voltage adjuster;
        a ripple filter electrically connected with the DC/DC converter; and
        a DC/DC self-drive switch electrically connected with the voltage adjuster, the current sensor and the DC/DC converter,
        when an extremely large inputted current is detected by the current sensor, the DC/DC self-drive switch is turned off to shut down an output current.

2. The power supply with adjustable outputted voltage according to claim 1, wherein the AC power input processing circuit further comprises:
    an AC socket;
    an Electromagnetic Interference (EMI) filter electrically connected with the AC socket;
    a rectifier electrically connected with the EMI filter;
    a high-voltage power switching converter electrically connected with the rectifier;
    a main transformer electrically connected with the high-voltage switching converter;
    a rectifier & ripple filter electrically connected with the main transformer; and
    a voltage adjuster electrically connected with the rectifier & ripple filter and the high-voltage power switching converter.

3. The power supply with adjustable outputted voltage according to claim 2, wherein the rectifier further comprises a power factor correction circuit to reduce the amount of inputted AC current.

4. The power supply with adjustable outputted voltage according to claim 2, wherein the high-voltage power switching converter is controlled by the voltage adjuster, thereby changing the outputted voltage.

5. The power supply with adjustable outputted voltage according to claim 2, wherein the high-voltage power switching converter is a flyback converter.

6. The power supply with adjustable outputted voltage according to claim 2, wherein the high-voltage power switching converter is a forward converter.

7. The power supply with adjustable outputted voltage according to claim 2, wherein the high-voltage power switching converter is a halfbridge converter.

8. The power supply with adjustable outputted voltage according to claim 2, wherein the high-voltage power switching converter is an active clamp flyback converter.

9. The power supply with adjustable outputted voltage according to claim 2, wherein the high-voltage power switching converter is an active clamp forward converter.

10. The power supply with adjustable outputted voltage according to claim 1, wherein the DC power input processing circuit further comprises a DC plug and an EMI filter, the EMI filter is electrically connected with the DC plug and the current sensor.

11. The power supply with adjustable outputted voltage according to claim 1, wherein the DC/DC converter is a buck converter.

12. The power supply with adjustable outputted voltage according to claim 1, wherein the DC/DC converter is a boost converter.

13. The power supply with adjustable outputted voltage according to claim 1, wherein the DC/DC converter is a buck-boost converter.

14. The power supply with adjustable outputted voltage according to claim 1, wherein the DC/DC converter is a Single Ended Primary Inductor Converter (SEPIC) converter.

* * * * *